United States Patent [19]

McRoskey et al.

[11] 4,121,733

[45] Oct. 24, 1978

[54] SPREADER HAVING AN ANTICLOGGING MECHANISM

[75] Inventors: John W. McRoskey; Leonard H. McRoskey, both of Los Angeles; Delbert D. Swartz, Torrance, all of Calif.

[73] Assignee: Republic Tool & Manufacturing Corp., Los Angeles, Calif.

[21] Appl. No.: 760,868

[22] Filed: Jan. 21, 1977

[51] Int. Cl.² ............................................. A01C 15/12
[52] U.S. Cl. ...................................... 222/43; 222/486; 222/611; 222/625
[58] Field of Search ................... 222/43, 45, 611, 614, 222/617, 624, 625, 410, 473, 482, 486, 517, 560, 177; 239/676, 683, 685

[56] References Cited

U.S. PATENT DOCUMENTS

| | | | |
|---|---|---|---|
| 1,888,821 | 11/1932 | Fearn | 222/486 X |
| 1,985,191 | 12/1934 | Nottingham | 222/611 |
| 2,546,702 | 3/1951 | Ready | 222/625 X |
| 2,589,425 | 3/1952 | Newman et al. | 222/625 X |
| 2,735,582 | 2/1956 | Wilson | 222/43 |
| 2,817,457 | 12/1957 | Liljenberg | 222/473 X |
| 2,817,460 | 12/1957 | Bond | 222/473 X |
| 2,840,275 | 6/1958 | Liljenberg | 222/625 |
| 3,224,636 | 12/1965 | Atkinson | 222/625 X |
| 3,412,905 | 11/1968 | Eichholz | 222/611 X |
| 3,836,052 | 9/1974 | Chopieska | 222/611 |

Primary Examiner—Robert B. Reeves
Assistant Examiner—Fred A. Silverberg
Attorney, Agent, or Firm—Whann & McManigal

[57] ABSTRACT

Our invention relates to a wheeled fertilizer or other granular material spreader which is pushed over the area or surface to be treated. The granular material is dropped through feed openings onto the surface to be treated, the metering of the granular material being accomplished by placing the metering blade in a desired position or positions depending upon what particular granular material is being discharged from the hopper.

14 Claims, 18 Drawing Figures

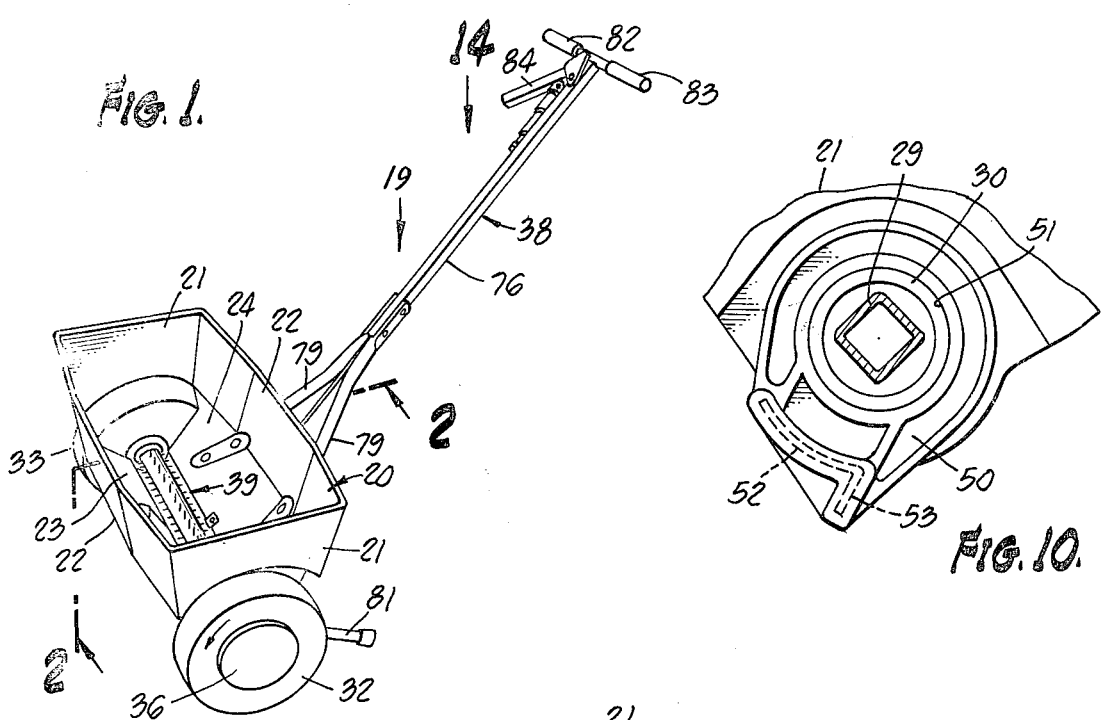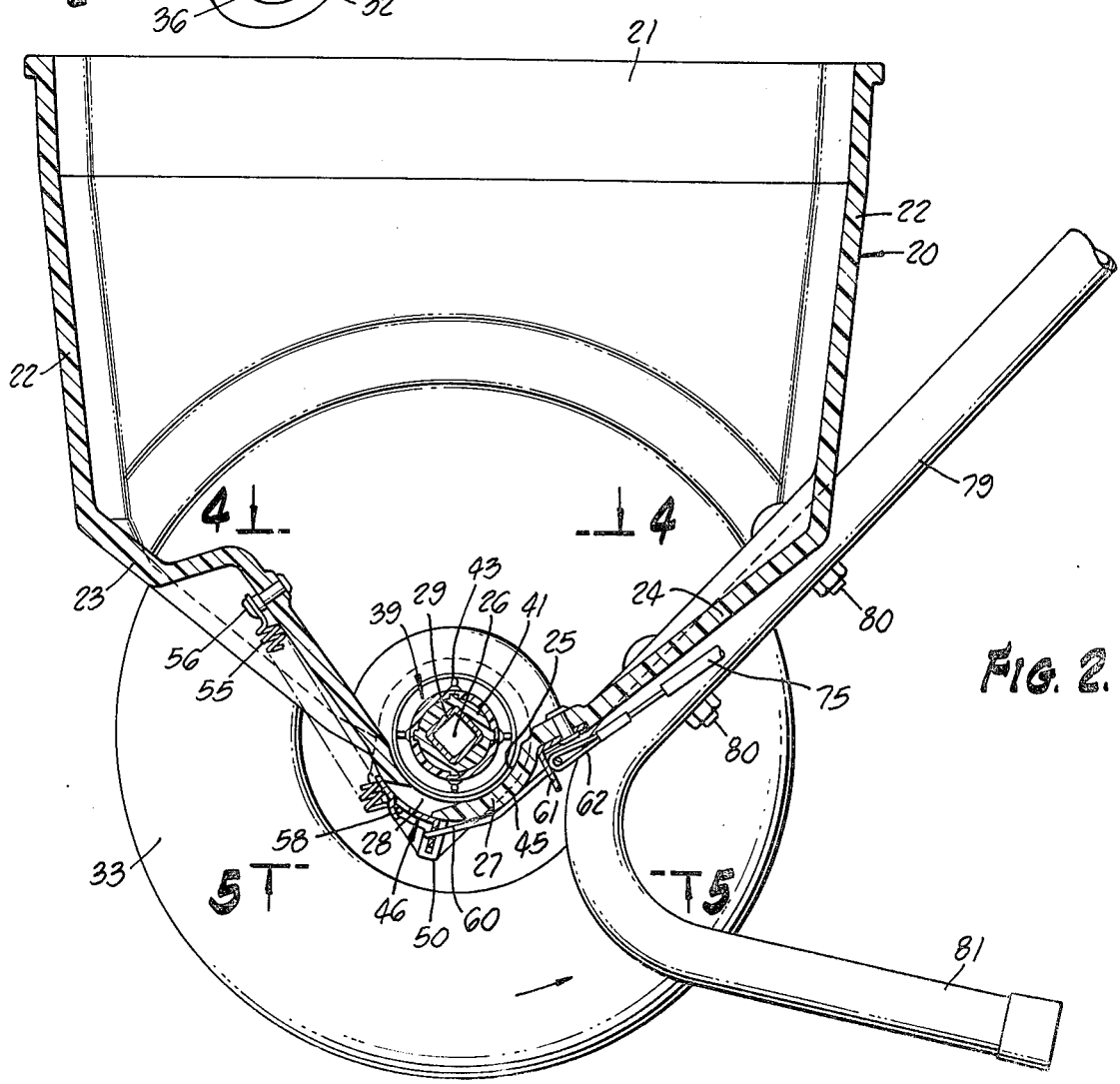

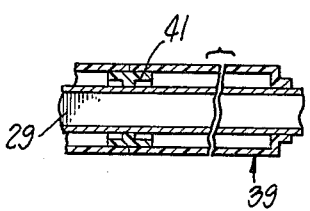
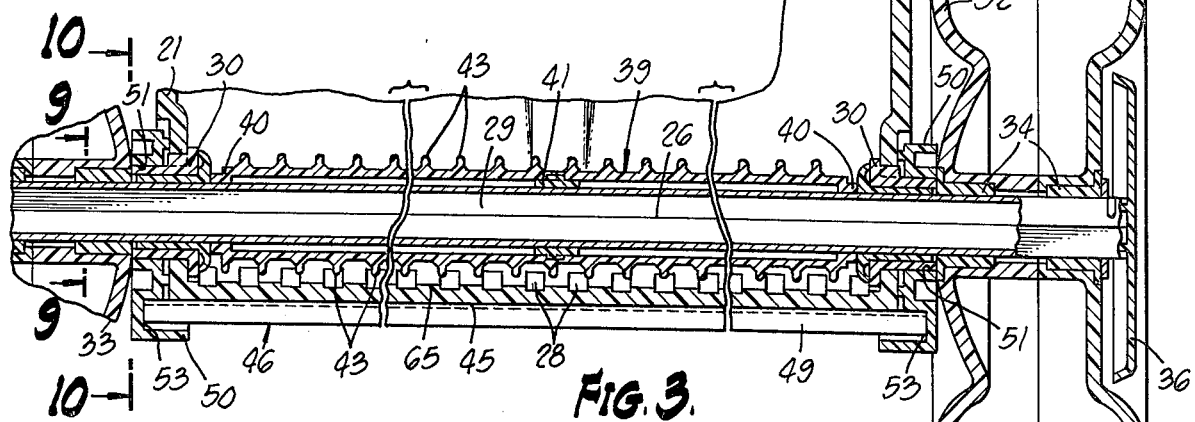
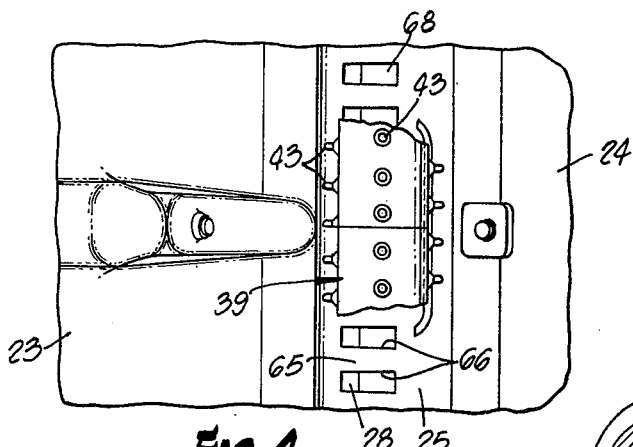
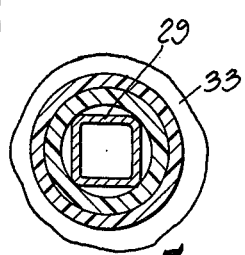
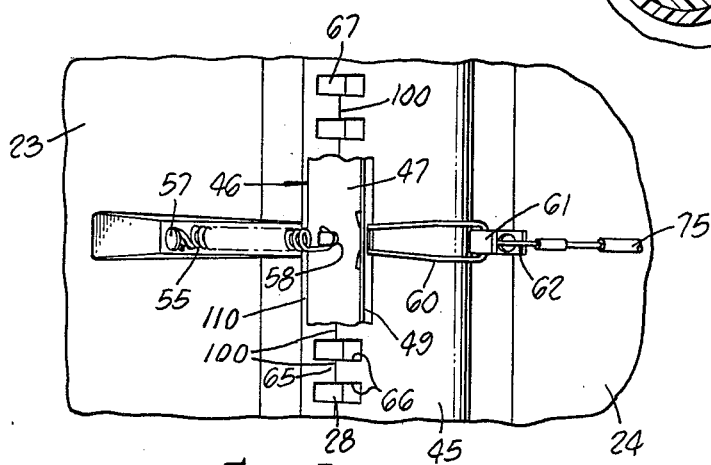
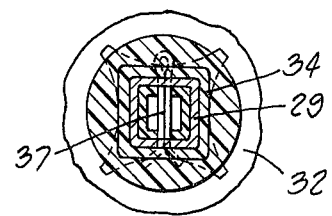

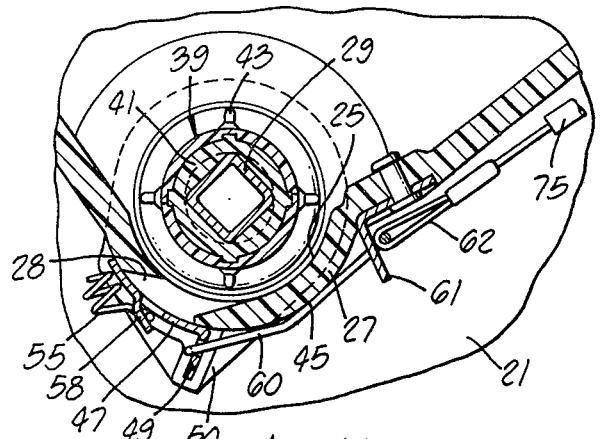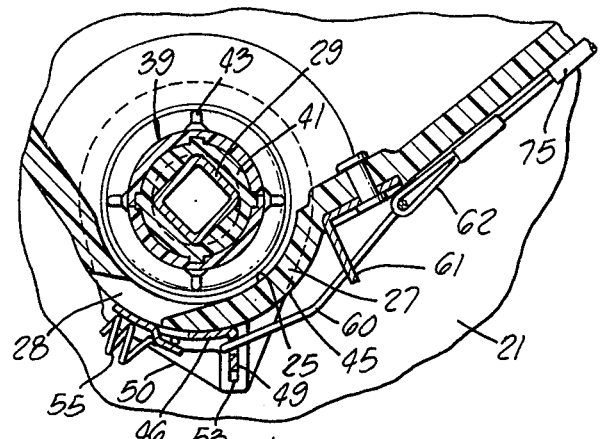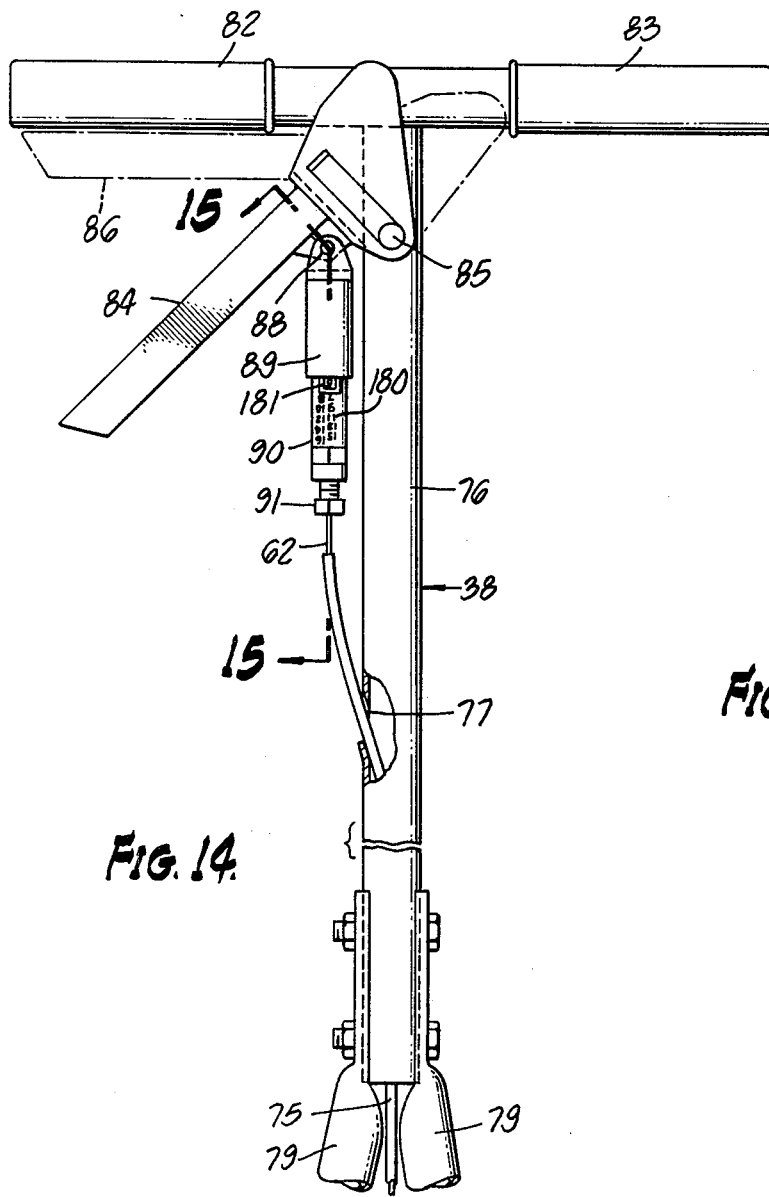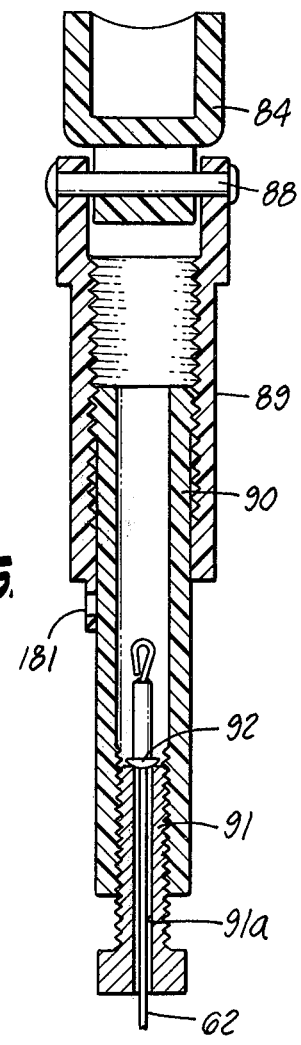

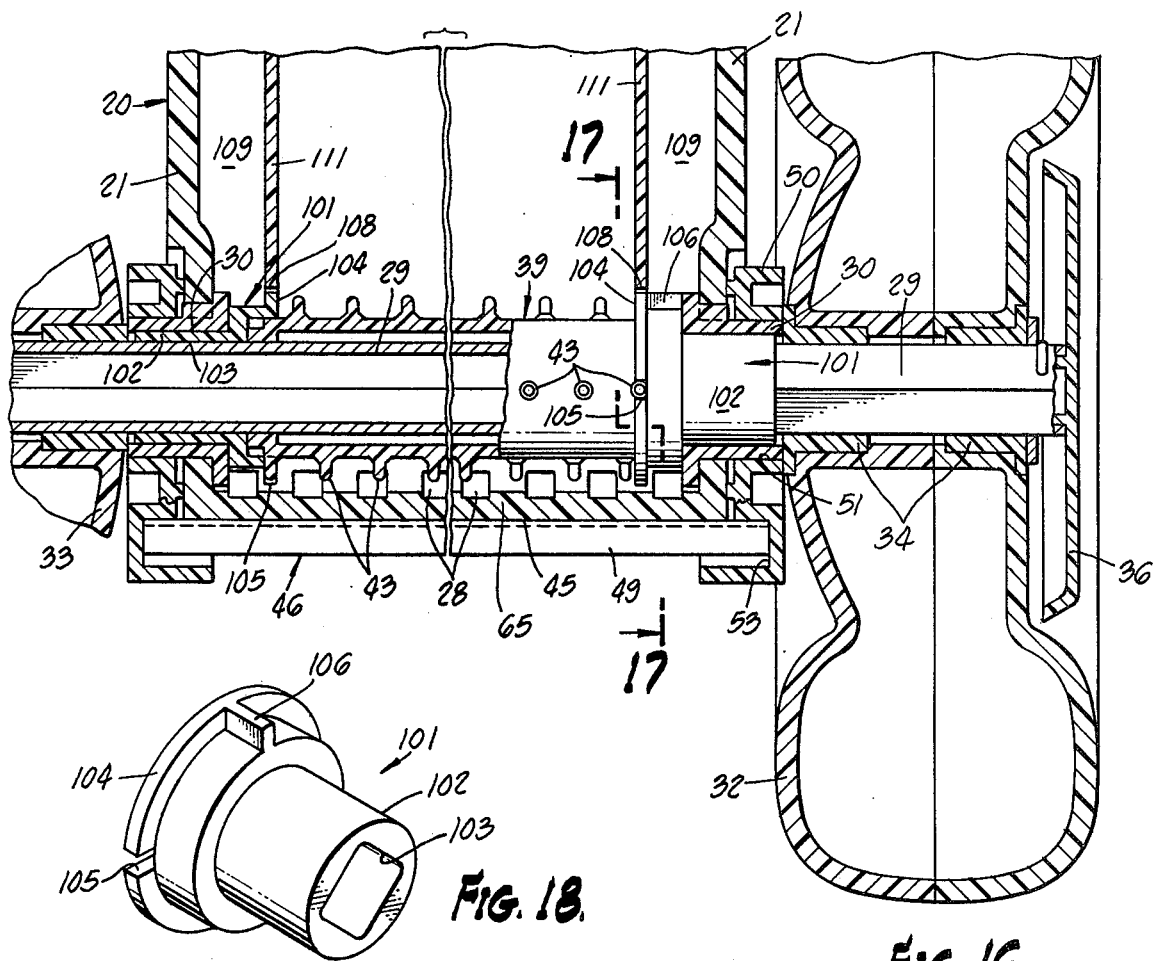
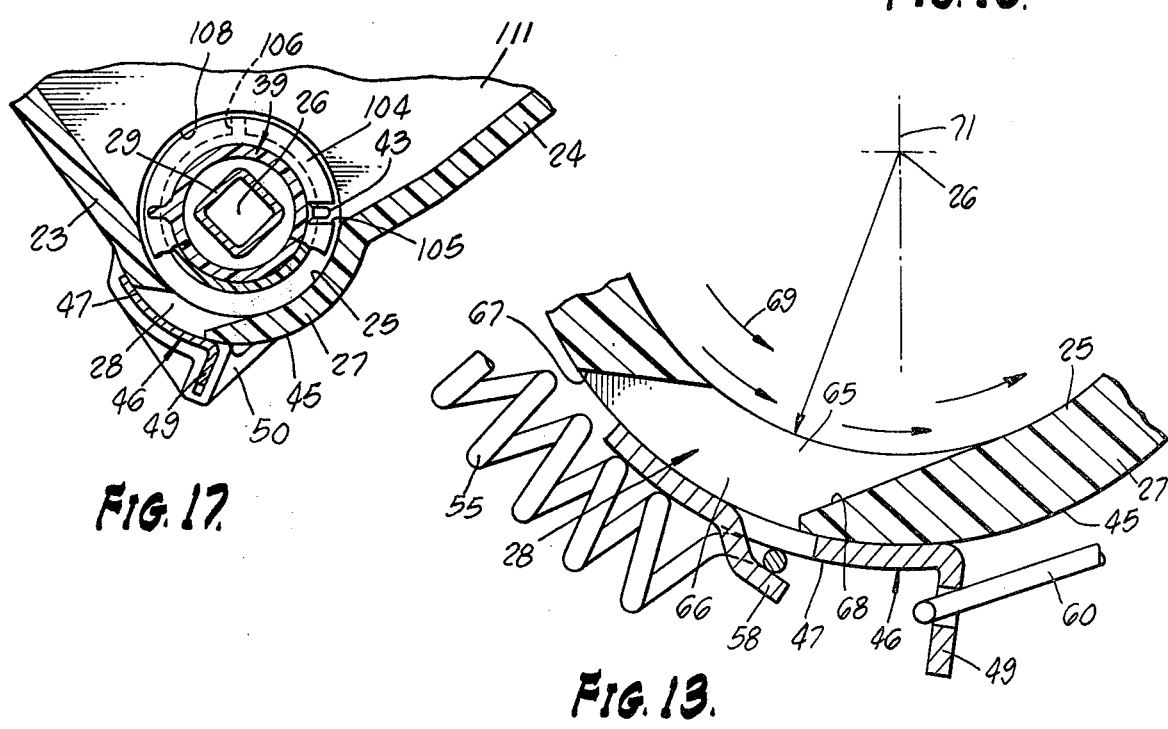

SPREADER HAVING AN ANTICLOGGING MECHANISM

THE PRIOR ART

Fertilizer spreaders and granular material spreaders are old in the art and are usually made from metal and plastic. It has been the general practice to ship spreaders fully assembled. However, plastic spreaders carry a high freight rate and it is, therefore, highly desirable to have a spreader in which the parts can be shipped in disassembled condition to enable packaging of the parts within cubic space requirements.

Numerous problems arise when parts are made from plastic for the reason that the plastic walls, etc. must be made much thicker because of less mechanical strength than similar metal parts.

SUMMARY OF THE INVENTION

It is an object of our invention to provide a spreader which can be shipped disassembled and thus freight rates redeuced.

It is a further object of our invention to provide a spreader in which the clogging and jamming of granular material in feed openings of the hopper will be eliminated and accuracy of metering be maintained.

It is another object of our invention to provide a spreader having feed opening means and a metering blade in which the metering blade will be held in pressural contact with the surface of the hopper and in which granules will not become lodged under the blade to separate the blade from its pressural contact with the hopper. In this way there will be no leakage of granular material and accuracy of metering will be accomplished.

It is a still further object of our invention to make the metering gate from a substantially thin metal blade in order to reduce weight and to be able to form it for close adherence to the adjacent surface or wall of the hopper.

It is also an object of our invention to provide an arrangement in which the metering blade or gate is pressurally held against a surface of the hopper by an operating means which includes stop means on one side of the metering gate against which the metering gate is pulled when in closed position in combination with a spring means connected to the metering gate which exerts a pull against the metering gate so that the pull of the spring is at all times active and in a direction to hold the blade or gate against the lower surface of the hopper.

It is highly undesirable that too much or not enough fertilizer or other granular material be applied to the surface being treated. Since the spreader is manually pushed over the ground and treats a strip area it is essential that each strip area be contiguous with the adjacent strip area so that the strip areas do not overlap or have spaces between them. It is, therefore, an object of this invention to provide the spreader with a marking means whereby one or both edges of the granular strip area being fed onto the surface are marked and that the operator may operate the spreader so that the strip areas will be contiguous and not overlap or not have spaces between them.

It is a still further object of our invention to provide a spreader with an operating lever at the handle which operating lever must be manually engaged and moved into an actuated position in order to cause an operating wire or member to open the metering gate to allow the granules to pass through the feed opening, and in such arrangement to provide for an automatic closing of the metering gate upon release of the lever so that when it is necessary to quickly close the feed opening it may be done so just by releasing this spring actuated lever.

With this type of an arrangement the metering gate may be quickly released, thus preventing unintended application of granular material and, because the control is at the pushing handles, to eliminate instability which would be caused by a remotely operated metering gate or blade.

It is a still further object of the invention to provide a metering gate operating assembly or mechanism with a microadjustment means adjacent to the operating lever, this adjustment means consisting of a pair of screw-threaded elements which can be set in order to determine an exact open position of the metering gate or blade so that accuracy of metering for different types of sizes of granules may be obtained so that the spreader may be used not only for, for example, spreading one type of fertilizer granules, but also for the accurate spreading of chemicals, seeds, weed killers, or other granular materials.

It is an object of the invention to provide such an adjustment at the handle of the spreader for easy checking and easy adjustment. By use of threaded members rotated relative to each other accuracy of fittings may be accomplished. By the use of indicia which may be brought into setting pressure, accuracy of metering may be quickly and easily obtained.

It is another object of our invention to provide the various controls and operations which can be accomplished without the operator removing either hand from the pushing handles or handle portions. In this way the operator can open and close the metering gate at his will and proper balance and operation may be maintained even in making relatively sharp turns.

Other objects and advantages of our invention will be brought out during the following detailed description of a preferred and alternative form of our invention.

BRIEF DESCRIPTION OF THE DRAWINGS

FIG. 1 is a perspective view showing our invention;

FIG. 2 is a cross-sectional view of the hopper portion of our invention taken along line 2—2 of FIG. 1;

FIG. 3 is a fragmentary cross-sectional view through the wheel axle and agitator arrangement of our invention;

FIG. 4 is a fragmentary view looking in a downward direction as indicated by the arrows 4—4 of FIG. 2;

FIG. 5 is a fragmentary view looking upward toward the bottom of the hopper on a plane as indicated by the arrows 5—5 of FIG. 2;

FIG. 6 is a fragmentary sectional view showing the manner in which one of the wheels drives the axle;

FIG. 7 is a fragmentary view taken on the line 7—7 of FIG. 6;

FIG. 8 is a fragmentary sectional view taken through the central part of the axle and agitator tube;

FIG. 9 is a fragmentary sectional view taken on the line 9—9 of FIG. 3;

FIG. 10 is a fragmentary sectional view taken on the line 10—10 of FIG. 8;

FIG. 11 is an enlarged cross-sectional view showing the agitator and measuring gate, the gate being in closed position;

FIG. 12 is a view similar to FIG. 11 showing the measuring gate in an open position;

FIG. 13 is a fragmentary enlarged view showing the precise shape of the drop slots or channels;

FIG. 14 is a fragmentary view of the handle arrangement looking downward as indicated by the arrow 14 in FIG. 1;

FIG. 15 is a fragmentary sectional view taken on the line 15—15 in FIG. 14;

FIG. 16 is a fragmentary view of the wheel axle and agitator arrangement of our invention showing means whereby marker lines may be applied to the surface to be treated;

FIG. 17 is a fragmentary sectional view taken on the line 17—17 of FIG. 16; and

FIG. 18 is a perspective view of an axle bearing which feeds the marking material.

DESCRIPTION OF THE PREFERRED EMBODIMENTS

Referring to FIGS. 1, 2, and 3 together in detail, the solid material spreader 19 includes a hopper 20 having side walls 21 and front and rear walls 22, the bottom of the front and rear walls is V-shaped and has inclined walls 23 and 24 which meet at a central vertical plane and the inner surface at this point is semi-cylindrical as indicated at 25, the semi-cylindrical wall 25 being generated around a horizontal axis 26.

In the wall portion 27 which provides the semi-cylindrical wall 25 are a plurality of forwardly-rearwardly extending feed opening means in the form of slots or channels. 28 comprising feed opening means which will be described in detail later.

The end walls 21 have bushings 30 centered on the axis 26 and rotatably supported in these bushings is a rotatable shaft or axle 29, which is square in cross-section and rotates on the axis 26. There are wheels 32 and 33, the wheel 32 has drive bushings 34 engaging the axle 29 and rotating it. The wheel 33 rotates freely on the axle so that the axle is driven by a single wheel and, therefore, the spreader can be moved through curved paths and around relatively sharp corners.

As shown in FIG. 6, end plates 36 are mounted beside the wheels for decorative purposes and are frictionally held in place.

The spreader 19 has a frame 38 secured to the hopper 20 whereby the operator may push the spreader 19 over the surface to be treated. This frame will be described in detail when the control parts for the measuring gate are discussed.

The agitator tube 39 surrounds the axle 29 and opposite ends thereof are reduced and have square openings 40 which engage the square axle 29 so that the agitator tube 39 is rotated. The agitator tube is made in two parts and adjacent ends at the center of the structure are supported by a support bushing 41. The agitator tube or agitator element has agitator pins 43 circumferentially arranged and radially disaligned or offset so that paths in the granular material made by each pin are overlapped so that there will be complete agitation entirely across the entire hopper and channeling in the granular material thus avoided.

The semi-cylindrical portion of the bottom of the hopper 27 which has the inner semi-cylindrical surface 25, also has an outer semi-cylindrical surface 45. The hopper is made from plastic material and is approximately one-quarter inch thick.

For the purpose of controlling the flow or movement of fertilizer or other granular material through the channels 28 is a measuring gate 46 which is shown best in FIGS. 11, 12 and 13. The gate is in the shape of an arcuate blade 47, which extends entirely across the hopper. The blade is semi-cylindrical and has the same radius as the semi-cylindrical surface 45 of the bottom wall. At the rearward edge of the arcuate blade 47 is a radial attaching flange 49.

The measuring gate 46 is supported at each end by a rotatable support 50 which has a cylindrical opening 51 rotatably supported by the bushing 30. Each rotatable support 50 has an arcuate slot 52 and a radial slot 53 which receives an end of the measuring gate 46. The rotatable supports move with the measuring gate and cause it to move through an arcuate path which is generated around the same axis 26.

There is a spring 55 which is attached to the bottom wall of the hopper by an attaching pin 56 and the free end is attached to the blade 47 by the lug 58. When the measuring gate is closed it is in the position as shown in FIG. 11 and there is a stop link 60 secured to the flange 49 and also in engagement with a stop element or flange 61, said parts comprising a stop means of the invention.

It will be noted that the spring 55 pulls the blade upwardly against the semi-cylindrical surface 45 of the bottom of the hopper. Also, it will be noted that the stop link 60 extends upwardly to the stop flange 61. The spring 55 is stretched so that the blade 47 is held tightly against the cylindrical surface 45. It will be noted that the spring is on one side of the measuring or metering gate or blade and the stop link is on the other side. When the measuring gate is in closed position the stop link 60 prevents movement of the measuring gate in a forward direction and the spring exerts a substantial force in holding the metering blade 47 in contact with the cylindrical surface 45.

It is highly important that the blade be held in pressural tight contact so that none of the granular material will get between the blade and the cylindrical surface 45 which would hold the blade away from the surface and interfere with the proper measuring. The spring and the flange stop 61 are on opposite sides of the measuring blade to provide a constant tension so that this tension is never reduced to the extent that the blade can move away from the cylindrical surface.

By this arrangement it is possible to keep the parts of light weight, thus providing an economical structure and a structure easy to operate yet providing a very efficient device.

The stop link 60 is connected to a pull wire 62. The operation of the pull wire 62 and its associated operating parts will be described later. However, when the pull wire is pulled in a rearward direction the stop link 60 is moved rearwardly into a position shown in FIG. 12.

To move into this position requires that the measuring gate be moved rearwardly into a position shown in FIG. 12, which, in turn, means that the spring 55 must be stretched and this stretching action increases the pressure of the blade 47 against the cylindrical surface 45. Thus, during this movement, the force of the blade against the surface 45 is increased. By an adjusting means which will be described shortly, the amount of the opening of the gate may be controlled and thus the amount of fertilizer or other granular material fed through the feed openings can be controlled.

Because of the fact that the plastic wall at the bottom is approximately a quarter of an inch thick, problems of bridging and jamming are created.

This is not a problem is metal hoppers in which the wall is only approximately forty-thousandths of an inch thick.

Referring to FIG. 13, each channel 28 is separated from an adjacent channel by a separating wall 65. Each channel is formed by parallel forwardly and rearwardly extending side surfaces or walls 66. The forward wall 67 of each slot is extended substantially horizontally with the result that in effect the forward wall is eliminated. The rearward wall 68 of each slot is also slanted considerably. It is not quite horizontal but it does have a considerable slant with the result that there is provided what we call a "ramp" or "ramp surface" 68. As the agitator rotates and the agitator pins move in the direction of the arrow 69 the granular material is agitated in a rear direction away from the forward end of the slot. Clogging or bridging is caused by the presence of a third wall in conjunction with the two side walls 66. By positioning the wall 67 to extend substantially horizontal the effect of the forward wall 67 is eliminated. As the material is agitated and pushed rearwardly the rear wall of the slot or channel is so inclined that it acts as a ramp and the agitated material will be swept upward and rearwardly along this ramp into the lower portion of the chamber of the hopper and not be trapped against the rear wall. Thus we have an arrangement in which the front and back wall effect is substantially eliminated and bridging or compacting is eliminated.

Accurate metering of the granules is important and in some instances vital where relatively exact amounts of fertilizer or weed killer must be applied to the surface or area being treated.

In order to control the accuracy of metering, the metering gate or blade must be held against the surface 45 of the hopper.

If the blade does not stay in pressural contact on the surface or wall 45 the granular material gets underneath the blade and becomes pushed away from the hopper wall, thus leaving a small space through which the granular material may leak.

This problem occurs when the blade reaches an almost closed position. The granules become jammed at the forward edge of the blade and at the forward end of the channels or slots. At this time the granules, which may be fertilizer or other granular material, are then permitted to flow between the blade and the lower wall of the hopper, and this further separates the blade on a continuing and increasing basis. This results in substantial metering accuracy. In applicants' invention we have overcome this problem by rotating the entire series of slots forwardly of the bottom of the hopper which is indicated by the center line 71 in FIG. 13. As will be seen from FIG. 13, the feed slot extends forwardly and upwardly so that when the metering blade is in an almost closed position the granules will fall downwardly and rearwardly instead of being jammed between the blade and the wall or walls of the slots. There are, therefore, no jammed granules for the blade to override.

For the purpose of opening and closing the gate positions of the measuring gate and for setting the open position of the measuring gate to discharge the proper or desired amount of granular material, we provide a deadman control means which will now be described.

The pull wire 62 extends upwardly through a flexible tube 75. The wire and tube enter the handle member 76 at its lower end as shown in FIG. 14, and exits from the member 76 at 77. Also secured to the lower ends of the handle member 76 are legs 79 secured to the hopper by bolts 80, the legs having feet 81 which engage the ground surface to support the hopper in an upright position.

Connected to the upper end of the frame bar 76 adjacent to the handle portions 82 and 83 is an operating lever 84 pivoted at 85 and movable into broken line position 86 adjacent the handle part 82. Pivotally connected at 88 to the operating lever 84 is an internally threaded socket 89 into which a numerical setting element 90 is threaded. The numerical setting element 90 has a series of measuring gate position indicia 180 which will be explained in detail later, and the socket 89 has a window 181 through which the indicia appears, depending upon the adjusted position of the numerical setting element 90. Threaded to the numerical setting element 90 is a calibration element 91. The upper end of the pull wire 62 is extended through the opening 91a of the calibration element and the upper end of the pull wire 62 is provided with a stop 92.

The purpose of the numerical setting element 90 is to vary the amount of gate opening to accommodate the required rate of feed of different weight and size of granular material. The purpose of the calibration element is to insure that at any given numerical setting on the numerical setting element the proper amount, and the specific desired gate opening is achieved.

It will be seen in FIG. 5 that the bottom of the hopper is provided with a calibration line 100. To make the calibration adjustment referred to, the operating lever 84 is moved into the position 86 which swings the blade into an open position. If the forward edge 110 of the blade 47 does not coincide with the gauge or calibration line 100, the micoadjustment is adjusted to bring the blade into alignment.

The main adjusting element has a series of indicia 180 which will be explained in further detail later, and the socket 89 has a window 181 through which one of the indicia appears, depending upon the adjusted position of the main or first adjustment means 90. This adjustment is normally present but should be checked by the operator and, assuming that the proper adjustment has not been made, it is made either at the factory or by the operator of the spreader as follows.

Numerical setting element 90 is set so that the numeral 5 is read through the window 181. The operator then engages the operating lever 84 and moves it to the position indicated by dotted lines 86. In this position the metering blade is in an open position. When the setting is at the numeral 5 the gauge or calibration line 100 and the forward edge 101 of the gate must coincide. If not, the calibration element 91 is then rotated in the proper direction to position the calibration line 100 exactly in alignment with the edge 101.

When this is done the metering blade 47 is then in the proper actuated position for use of the spreader in applying certain granular material to the surface, for example, with a setting of No. 5 Ortho Grow Lawn Food 22-4-4 or Ortho Weed and Feed 25-3-7.

Now when other type or size of granular material is to be applied the numerical setting element 90 can be rotated to bring any one of other indicia into the window 181. For example, when Ortho Lawn Food 24-4-8 is being spread over the surface, setting No. 6 is the correct setting. For Ortho Crab Grass Control 18-3-6 plus Lawn Food, 6½ is the proper setting. Weed killers or chemicals, etc. require a different indicia setting ranging from 3 to 11 or more. A setting guide is provided with each spreader.

It will be seen that after the metering blade has been adjusted into the right position for numeral 5 there is no need to further touch the calibration element 91. All that is required is to adjust the numerical setting element to bring the proper indicia number into the window area 181.

The term "granules" or "granular material" is intended to apply to all granular material including fertilizers, seeds, chemicals or whatever other material is desired to be spread over the surface.

The control of the measuring gate is done at the handle which is engaged by the operator. When it is desired to feed material through the feed opening the operator engages one of the handle parts 83 with one hand and the other handle part 82 with the other hand and in order to open the gate he extends his fingers down around the operating lever 84 or takes his hand and moves the operating lever into the position 86 and then clamps the two together as he moves the spreader 19 forwardly.

If it is desired to stop the flow of granules from the hopper this can be done by the operator without moving either hand from the pushing handles. This would be done where the device is pushed over an area that is not to be treated or in going around curves or corners where no treatment is desired.

The total operation of our invention is briefly related as follows: the hopper, of course, is at least partly filled with the granular material which is to be spread. This may be fertilizers, chemicals, seeds, weed killers or any material of granular form which is to be spread over a lawn or other area.

The operator engages the handle portions 82 and 83, raises it upwardly to remove the feet 81 from engagement with the ground and as he starts to push the spreader forward he moves the operating handle from full line position into broken line position as shown at 86. It is assumed, of course, that adjustments have already been made so that when the gate is in open position it occupies a proper open position for number 5, or in a slightly different position as desired by the operator and determined by the numerical setting.

As the operating lever is moved into the operating position, which opens the metering blade as previously described, the operator pushes forwardly on the spreader 19 which rotates the wheels 32 and 33, which, in turn, rotates the axle 26 and the agitator 39 to loosen the granular material so that it will freely move down through the feed channels 28.

With two hands engaging the handle portions 82 and 83 there is an easy balance to the spreader 19 and the blade can be opened and quickly closed as required without disengaging either of the hands from the pushing handles 82 and 83.

The control of the measuring gate is done at the handle which is engaged by the operator. If it is desired to stop the flow of granules from the hopper this can be done by the operator without removing either hand from the pushing handle. This would be done where the device is pushed over an area that is not to be treated or in going around curves or corners where no treatment is desired.

Complete control of the opening and closing of the measuring gate as quickly as desired is accomplished without removing either of the hands from the handle portions 82 and 83. In this way stability is maintained in the spreader and the spreader 19 can be moved in a straight path, and the pushing pressure not be unbalanced such as would occur if it were necessary to remove one of the operator's hands from one of the handle portions.

It, of course, is highly desirable to completely cover the area to be covered, and it is also desirable that there be no overlapping of the strips of area covered as the fertilizer device is moved forwardly.

If there is any overlapping there is a danger of over-treating and if there are any blank spaces there is, of fource, a total absence of treatment material from these stripped areas.

In FIGS. 16 to 18 we disclose an alternative form of our invention which provides for the marking of a line along either or both edges of the path along which the fertilizer or other granular material is dropped. This is accomplished by placing near the side walls 21 of the hopper partitions 111, which are shown in FIGS. 16 and 17. Inserted in each of the sleeves 30 is a feed bushing 101 which has a hub 102 having an outer cylindrical surface which rotates in the member 30 and has a square opening 103 through which the shaft 29 extends and in this way the feed bushings are rotated. The flange 104 of the feed bushing has one or more slots 105 into which the adjacent pin 43 may extend and also the feed bushing has a single radial blade 106 which kicks marking material through the feed slot 28 immediately adjacent thereto. The lower portions of the partition 111 has cylindrical walls 108 which fit closely to the circumference of the flange 104 to prevent leakage in or from the marker material chambers 109.

In using this form of our invention, marking material may be placed in one or both of the chambers 109 and as the fertilizer is pushed forward the single impeller or blade 106 will periodically agitate the marker material and will deposit a full line or broken line of marker material at the boundary or boundaries of the path or longitudinal area covered by the fertilizer or other granular material.

If the spreader 19 is being pushed only in one direction throughout the application of granular material, then it is only necessary to place flour or lime or other marker material in one of the chambers 109.

When the operator makes another round he can push the device so that the edge of the granular material being distributed will coincide with the mark which defines the edge of the already deposited strip or path of fertilizer or other granular material.

We claim:

1. In a wheeled spreader for dropping divided material on a surface, the combination comprising:
    (a) a hopper providing containment of a granular material to be applied to a surface, said hopper having a vertical center line;
    (b) feed opening means in the lower part of the wall of said hopper through which said granular material is fed for application to said surface, said feed opening means consisting of a plurality of openings, each being formed by side walls, a forwardly positioned and forwardly extending forward wall and a rearward wall, and said feed opening means being positioned forwardly of the vertical center line of said hopper and extending forwardly and upwardly toward the front of said spreader;

(c) metering gate means engageable with a lower wall of said hopper and slidably movable between closed and opened positions;

(d) stop means on one side of said metering gate means against which said metering gate means is pulled when in a closed position;

(e) spring means connected to said metering gate means on the side opposite to said stop means for holding same in closed position and against said stop means;

(f) a handle connected to said hopper having a hand-engaging part;

(g) an operating lever pivoted adjacent said hand-engaging part; and (h) an operating member connected between said operating lever and said metering gate means whereby said metering gate means may be pulled into open position against the action of said spring means.

2. A combination as defined in claim 1, in which there is a first adjusting means and a second adjusting means connected in series between said operating lever and said operating member, said first adjusting means enabling the setting of the metering gate to alternative open positions to obtain the required rates of feed of different materials, and said second adjusting means permitting calibration of said metering gate to insure that in any given setting of said measuring gate on said first adjusting means a proper amount of gate opening is achieved.

3. In a wheeled spreader for dropping divided material on a surface, the combination comprising:

(a) a hopper providing containment of a granular material to be applied to a surface, said hopper having a vertical center line;

(b) feed opening means in the lower part of the wall of said hopper through which granular material is fed for application to said surface;

(c) metering gate means engageable with a lower wall of said hopper and movable between closed and opened positions;

(d) stop means on one side of said metering gate means against which said metering gate means is pulled when in closed position; and (e) spring means connected to said metering gate means for holding same in closed position and against said stop means, said stop means and said spring means always pulls on said metering gate means so that said metering gate means will always be held in pressural engagement with said lower wall of said hopper.

4. A combination as defined in claim 3, in which the surface of said lower wall of said hopper and said metering gate means are semi-cylindrical and in which said metering gate means slidably moves in an arcuate path between closed and opened positions.

5. A combination as defined in claim 4, including guide means for said metering gate means for guiding same in an arcuate path.

6. A combination as defined in claim 3, in which said spring means and feed stop means are both connected to said hopper above said metering gate means.

7. A combination as defined in claim 3, in which said stop means includes a stop element mounted on said hopper and a stop link connecting between said stop element and said metering gate means, and an operating means connected to said stop link, providing for pulling said stop link in an upwardly direction.

8. A combination as defined in claim 3, in which said feed opening means consists of a plurality of openings formed by side walls, a forwardly positioned wall extending in a forward direction, and a rearward wall.

9. A combination as defined in claim 8, in which said rearward wall extends in a forward direction.

10. A combination as defined in claim 9, in which said forward wall extends in at least a substantially horizontal direction from the inner surface of the lower part of said hopper.

11. A combination as defined in claim 3, in which said feed opening means is positioned forwardly of the vertical center line of said hopper and extends forwardly and upwardly from approximately said center line.

12. A combination as defined in claim 3, in which said feed opening means is formed by side walls, a forwardly positioned wall extending in a forward direction, and a rearwardly positioned wall, and in which said feed opening means extends from the lowest part of said hopper in a forwardly and upwardly direction.

13. In a wheeled spreader for dropping divided material on a surface, the combination comprising:

(a) a hopper providing containment of a granular material to be applied to a surface, said hopper having a vertical center line and a horizontal center line;

(b) opening means in the lower part of the wall of said hopper through which granular material is fed for application to said surface, said feed opening means being positioned forwardly of the vertical center line of said hopper and below said hopper horizontal center line so that said opening extends forwardly and upwardly toward the front of said spreader, said feed opening means including a plurality of openings, each being formed by side walls, a forwardly positioned and forwardly extending forward wall and a rearward wall, said forward wall being essentially horizontal to open outwardly of said hopper, said rearward wall being slanted with respect to the horizontal and with respect to said forward wall so the effects of said forward and rearward walls on said each opening are essentially eliminated;

(c) metering gate means engageable with a lower wall of said hopper and slidably movable between closed and opened positions;

(d) stop means on one side of said metering gate means against which said metering gate means is pulled when in a closed position;

(e) spring means connected to said metering gate means on the side opposite to said stop means for holding same in closed position and against said stop means, said spring and said stop means holding said gate snugly against said hopper wall at all times, including during movement of said metering gate to prevent material from lodging between said hopper wall and said metering gate;

(f) a partition in said hopper near an end wall thereof to form a separate compartment for marker material; and (g) agitation means positioned in the main part of said hopper and said separate compartment of said hopper for agitating the granules in said main part of said hopper and the marker material in said separate compartment of said hopper whereby a granular material will be distributed to the surface to be treated, and whereby the marker material will be delivered to said surface to form a marker line at the edge of the area where said granular material is distributed.

14. A wheeled spreader for dropping divided material on a surface comprising:

a hopper for containing granular material to be applied to a surface, said hopper having a vertical center line and a hopper horizontal center line;

agitator means located within said hopper for moving granular material within said hopper;

feed opening means located in a lower portion of said hopper through which granular material flows for application to a surface, said opening means being positioned forwardly of said hopper vertical center line and upwardly toward the front of said hopper and below said hopper horizontal center line, said feed opening means including a plurality of openings defined in a wall of said hopper, said openings each being defined by a forward wall which is substantially horizontal to open outwardly of said hopper and a rearward wall which is slanted with respect to said hopper vertical center line and with respect to said forward wall to define a ramp for guiding that portion of the granular material which does not move through said each opening away from said each opening when such material is moved by said agitator means, said horizontal front wall and said slanted rearward wall having virtually no effect on flow of material through said each opening;

a metering gate slidably mounted on a lower wall of said hopper adjacent said each opening to be slidably movable from a position covering said each opening to a position uncovering said each opening;

stop means connected to said hopper on the side of the hopper in which said opening rearward walls are located to be on one side of said metering gate, said metering gate being pulled against said stop means when in a covering position;

a spring connected to said hopper on the side thereof in which said opening front walls are located and connected at the other end thereof to said metering gate on the side opposite to said stop means, said spring biasing said metering gate into a covering position, said spring pulling said metering gate upwardly against said hopper lower wall for holding said metering gate snugly against said hopper lower wall at all times, including during movement of said gate so that granular material is prevented from becoming lodged between said metering gate and said hopper lower wall; and operating means connected to said metering gate for moving said gate into said opening uncovering position.

* * * * *